United States Patent [19]

Klann

[11] Patent Number: 4,682,395

[45] Date of Patent: Jul. 28, 1987

[54] DEVICE FOR PUSHING WHEEL FLANGE HUBS AND SPLINED FLANGE HUBS OF MOTOR VEHICLES OUT OF A SHAFT BEARING

[76] Inventor: Horst Klann, Terra Wohnpark 12, 7730 Villingen-Schwenningen 24, BRD, Fed. Rep. of Germany

[21] Appl. No.: 892,483

[22] Filed: Aug. 1, 1986

[30] Foreign Application Priority Data

Aug. 28, 1985 [DE] Fed. Rep. of Germany ....... 3530726

[51] Int. Cl.[4] ........................ B23P 19/04; B23P 19/00

[52] U.S. Cl. ........................................ 29/261; 29/263; 29/426.5

[58] Field of Search ................. 29/261, 262, 263, 802, 29/426.5

[56] References Cited

U.S. PATENT DOCUMENTS

| | | | |
|---|---|---|---|
| 2,170,461 | 8/1939 | Pepperdine | 29/261 |
| 2,376,721 | 5/1945 | Piper | 29/261 |
| 2,835,029 | 5/1958 | Collins, Sr. | 29/261 |
| 2,971,254 | 2/1961 | Fairfield | 29/261 |
| 4,288,900 | 9/1981 | Overton | 29/263 |

FOREIGN PATENT DOCUMENTS

| | | | |
|---|---|---|---|
| 18076 | 6/1916 | United Kingdom | 29/262 |

*Primary Examiner*—Howard N. Goldberg
*Assistant Examiner*—Steven Nichols
*Attorney, Agent, or Firm*—McGlew and Tuttle

[57] ABSTRACT

A device to push a wheel flange hub or splined hub of motor vehicles out of a shaft bearing press-fitted in a bearing cylinder is of simple design and easy to handle and, in addition, adjustable to different diameters of various bearing cylinders. The device includes two each semi-cylindrical spreader sectors supported on the one hand by axial pins in eccentric axial holes in a supporting member resembling an internally threaded ring so they can swivel while having at their opposite ends projections which project radially outward and can be inserted in form closing fashion into an annular groove of the bearing cylinder. A threaded spindle equipped with a wrench engagement head and a spreading cone is adjustably screwed into a central, tapped hole of the supporting member by means of which threaded spindle the spreader sectors can be spread apart. Seated in a central, tapped hole of the threaded spindle is a pressure screw with a pressure transmitting part and a wrench head. The supporting member is provided with several pairs of holes, each pair located on the same radii of different size, to accommodate the pins of the spreader sectors.

6 Claims, 4 Drawing Figures

R1
R2
R3

DEVICE FOR PUSHING WHEEL FLANGE HUBS AND SPLINED FLANGE HUBS OF MOTOR VEHICLES OUT OF A SHAFT BEARING

FIELD AND BACKGROUND OF THE INVENTION

This invention relates in general to automobile wheel working accessories and in particular to a new and useful device for pushing wheel flange hubs or splined flange hubs of motor vehicles out of shaft bearings.

The invention relates to a device to push wheel flange hubs or splined flange hubs of motor vehicles or the like out of shaft bearing press-fitted in a bearing cylinder which has, at least at one bearing face, and an annular groove for the accommodation of a snap rig, and includes a pressure member supported by the bearing cylinder and actuatable by screw threads.

In one known device of this kind (German GM 84 34 762), the pressure means used to pull the wheel flange hub off a double row ball bearing of the bearing cylinder consists of several threaded studs which are screwed into axial, tapped holes in the flange of the wheel flange hub and are supported by a radial surface on the face of the bearing cylinder. Since it is not possible to turn all threaded studs uniformly and simultaneously, it is also impossible to prevent canting of the wheel flange hub with these means. Therefore, these means are most inadequate for the proper removal of the wheel flange hub from its ball bearing.

Also known already are devices to push shaft ends out of press-on-bearing rings or the like (French Pat. No. 959,338) in which there are guided, so as to be axially and radially movable in a cylindrical sleeve concentric to the sleeve axis, several clamping sectors which can be tightened by means of a spreading cone screwed into an internal thread of the outer sleeve so that their ends opposite to the spreading cone grip like hooks behind the ring to be pulled off, or that internal, annular beads of the clamping sectors engage an annular groove of a bearing ring. The sleeve end opposite the internal thread is provided with an inside cone, against which the clamping sectors support themselves in order to be moved radially inward upon an axial motion. The spreading cone itself also has a coaxial, threaded bore, into which a pressure screw is screwed, by means of which the axial pressure required to push the shaft out can be exerted upon the face of the shaft end.

Because no possibility is provided in these devices to bring any kind of supporting elements into form closing engagement with the bearing cylidner, they cannot be used for the purpose of the invention.

In another known device to pull ball bearings, bearing bushings and bearing rings or the like out of their seats and housings there are disposed on a crossbar supporting feet which are diametrically opposite each other in relation to a threaded spindle, are radially adjustable and can be placed on the rim of a part from which e.g. a ball bearing is to be pulled (German Pat. No. 857 329). The threaded spindle has at its lower end a collet whose neck has an internal thread in engagement with the thread of the threaded spindle and whose expansion legs can be spread apart by a spreading cone. The spreading cone has a long shank which penetrates the hollow threaded spindle and whose upper end has a thread which protrudes out of the upper end of the threaded spindle and can be tightened in axial direction by means of a nut sitting on the upper face of the hollow threaded spindle. The threaded spindle itself is also provided with a tightening nut supported by an annular bearing of the crossbar.

While this device is capable of pulling annular parts out of holes, such devices are not suited to push wheel flange hubs or splined hubs out of shaft bearings of a bearing cylinder of motor vehicles.

In another known device of similar kind (U.S. Pat. No. 3,611,540), serving to pull out an annular seal consisting of a metal ring and an elastic ring and sitting in a cylindrical hole and surrounding a stub shaft, a pulling tube is provided whose front end has spreading fingers which taper down in radial direction, are relatively thin and have hook-shaped gripping shoulders which can be pushed through the elastic ring. Seated in this pulling tube is an axially movable spreading sleeve whose end protruding out of the spreading fingers has a conical expansion and whose opposite end has an internal thread into which a threaded bolt is screwed whose wrench head is seated on the face end of the pulling tube. By means of this threaded bolt the spreading sleeve can be moved axially relative to the pulling tube so that the spreading fingers can be spread apart. Seated in the threaded bolt itself, which has a coaxial, tapped hole, is a pressure screw whose end protruding out of the threaded bolt has a wrench head and its opposite end a pressure transmitting part which can be placed on the face of a shaft surrounded by the annular seal. This device is not suited for the purpose of the invention either. The same applied also to other pulling devices serving to pull press-fitted rings or ball bearings out of hollow shafts, tubes or the like (U.S. Pat. No. 2,031,938). This device has a supporting bell which can be placed on the face of the tube out of which the ring or ball bearing is to be pulled. Freely rotatable in this supporting bell is a threaded spindle whose lower end has a spreading cone, and its upper end, protruding out of the supporting bell, has a butterfly nut sitting on a counterbearing surface of the supporting bell. Seated on the spreading cone are two diametrically opposite spreading fingers which have hook-like gripping elements projecting radially outward and able to grip behind the ring to be pulled out. These spreading fingers have radial angular parts with holes penetrated by the threaded spindle. Above and below these two angular parts are theaded nuts, by means of which the axial position of these spreading fingers on the threaded spindle can be fixed.

Apart from the fact that all known devices cannot be used for the purpose of the invention, they have the additional drawback that their spreading elements are tailored to strictly define diameters and that, for this reason, they cannot be adjusted to relatively wide diameter ranges.

SUMMARY OF THE INVENTION

The invention provides a simple pushing device which is as space-saving as possible, is adjustable to different bearing cylinder diameters and makes it possible, in a simple manner and with the necessary functional reliability, to push wheel flange hubs or splined flange hubs of motor vehicles out of their shaft bearings in which they are firmly seated, making certain at the same time that the compressive forces required for the pushing action become effective in exactly coaxial direction and that damage to the hub is prevented with certainty.

In accordance with the invention a device for pushing wheel flange hubs and splined flange hubs of motor vehicles out of shaft bearings which are press-fitted in a bearing cylinder comprises a bearing cylinder which has an annular groove for the accommodation of a snap ring which is engaged by a pressure transmitting part including a threaded spindle having a spring cone which are supported by the bearing cylinder. The spindle has an internal threaded bore which is engaged by a pressure screw which has an end with a pressure transmitting part and it is threaded into a threaded bore of a support disc which is engaged with spreader sectors. The spreader sectors are provided at their outer surface of their ends which extend away from the support member with anchoring projections which are insertable in the annular groove of the bearing cylinder. Spreader sectors spreadable apart by the spreading cone which is located between the bearing cylinder and the spreader sectors.

The construction is of simple design and is very easy to handle.

The spreader sectors advantageously have their faces which face the supporting member centrally disposed axial pins and the supporting member is provided with several pairs of axially extending holes located on the same radial eye as the pins but spaced differently from the center line of tap bore of the support and they provide a swivel connection between the sectors and the support member. Construction assures the possibility that the devices can be readily disassembled and mounted and the spreader sectors can be adjusted in a very simple manner to different inside diameters of different bearing cylinders.

Advantageously the pressure transmitting part has an outer surface resembling a truncated cone. It is advantageously elastically mounted on a trunion or extension of the pressure screw. Ths construction assures that the pressure transmitting part is automatically centered in the bore of the wheel flange for splined flange hub to be removed when the compressor forces become effective.

In accordance with another embodiment of the invention the spreader sectors each have on their inside an annular edge or annular surface which is in contact with the spreading cone and is offset relative to the anchoring projections which are formed in the sector by a dimension corresponding to at least the axial spreading stroke of the spreading cone. The spreading cone also advantageously has on its face opposite the threaded spindle a depression in which the pressure transmitting part is axially immersible at least in part.

Accordingly it is an object of the invention to provide an improved device for facilitating the pushing of wheel flange and splined flange hubs which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 3 is an end elevational view of the supporting member designed as annular disc shown in FIG. 1.

DESCRIPTION OF THE PREFERRED EMBODIMENTS

Figures 1, 2, 3, 4:
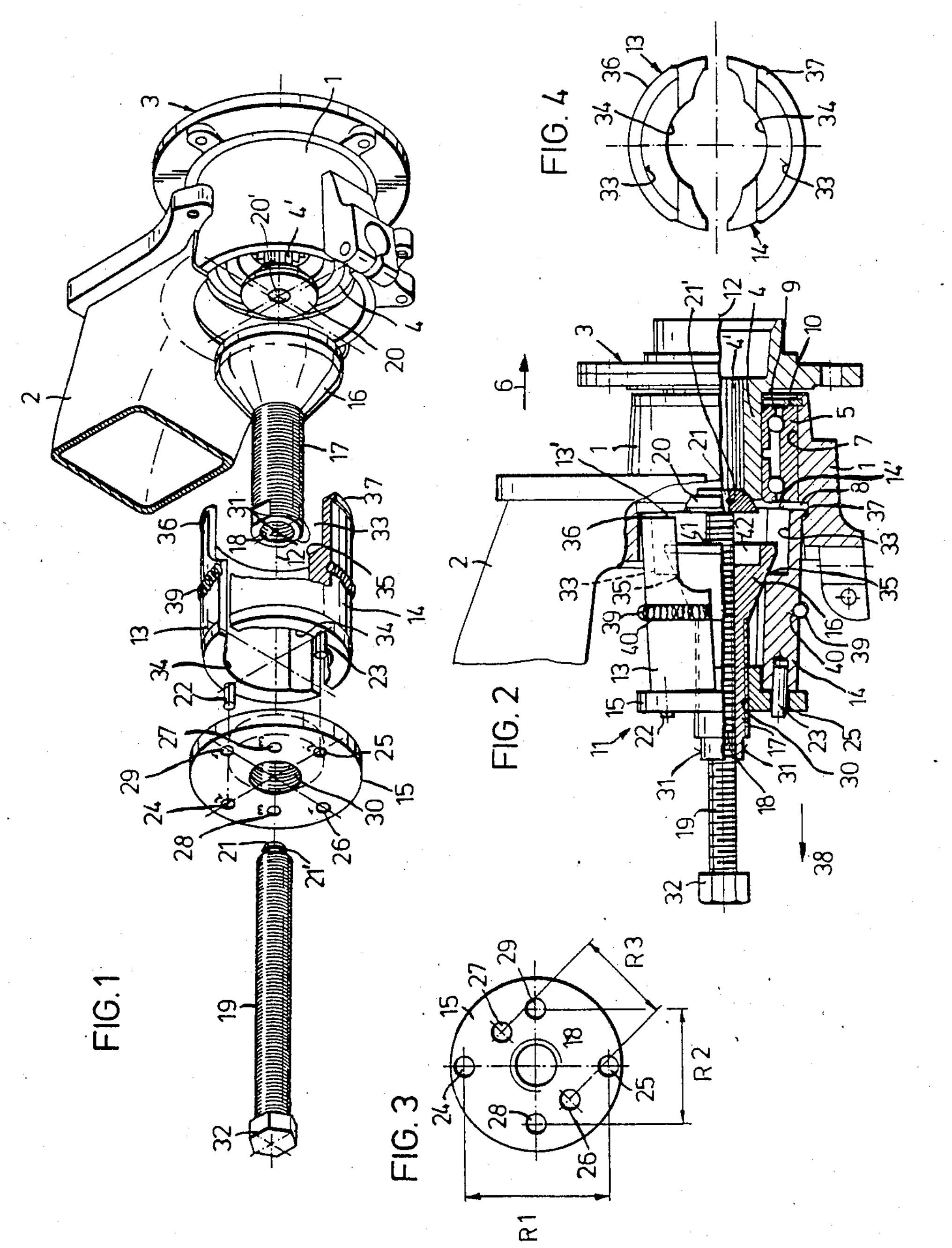
FIG. 1 is a perspective exploded view of a pushing device with a wheel flange hub or splined flange hub seated in a motor vehicle wheel bearing constructed in accordance with the invention.
FIG. 2 is a partial side elevational and sectional view of the device of FIG. 1.
FIG. 3 is a partial side elevational and sectional view of the device of FIG. 1.
FIG. 4 is a front elevational view of the two spreader sectors shown in FIG. 1.

Referring to the drawings in paticular the invention embodied therein comprises a device for pushing wheel flange hubs and splined flange hubs of motor vehicles or similar device out of a shaft bearing which is press-fitted in a bearing cylinder 1. The cylinder 1 has a bearing face with an annular groove for the accommodation of a snap ring.

Besides the device according to the invention, FIGS. 1 and 2 depict also the bearing cylinder 1 of a motor vehicle steering knuckle 2 with a wheel flange hub 3. The wheel flange hub 3 has a cylindrical, hollow, splined hub 4 in which a roller bearing 5 serving as a wheel bearing is press-fitted and which is to be pushed in the direction of arrow 6 by means of the device according to the invention out of this roller bearing 5 which remains in the bearing cylinder 1, at least for the time being. The roller bearing 5 is pressed into the cylindrical bore 7 of the bearing cylinder 1 and secured against axial shifting by two snap rings 10 seated in annular grooves 8 and 9. To apply the device according to the invention, hereinafter called a pressure tool or pushing device 11 and serving to push the wheel flange hub out of the roller bearing 5, the snap ring 10 has already been removed from the annular groove 8, for which reason it is not visible in FIGS. 1 and 2.

The pressure tool 11 includes two spreader sectors 13 and 14 which are diametrically or in mirror image opposite each other in relation to a common axis 12 and comprise semicylindrical, cup-shaped parts, a supporting member 15, a spreading cone 16 with a hollow, threaded spindle 17 which has an internal thread 18, a pressure screw 19 and a pressure transmitting part 20 elastically disposed on a cylindrical face extension 21 of the pressure screw 19. The internal thread need not extend over the entire length of the threaded spindle 17. The two spreader sectors 13 and 14, of identical design per se, have on their end faces facing the supporting member 15. Laterally disposed axial pins 22, 23 can each be inserted in pairs into respective axial holes 24 and 25 of the pressure part 15 designed as cylindrical disc, said axial holes being disposed in pairs on the same radius. The diameters of the axial holes 24 and 25 are larger than the diameters of the axial pins 22 and 23 so that, when the axial pins 22 and 23 are inserted in the axial holes 24 and 25, the spreader sectors 13 and 14 can swivel also in radial direction.

As may be seen from FIGS. 1 and 3, the pressure parts include the support 15 which has a total of three such pairs of axial holes, namely the additional pairs 26, 27 and 28, 29, each disposed symmetrical to the centerline or center of the discshaped support or member 15. The spacings R1, R2, R3 of the holes differing, or are disposed in pairs on different radii R1/2,R2/2, R3/2. By means of these axial holes 24 to 29, disposed different distances apart from each other, it is possible to adjust the two spreader sectors 13 and 14 to different diameters. In addition, the disc-shaped supporting member 15 has a central, threaded hole 30 in which the threaded spindle 17 can be screwed or is in an assembled state. To be able to turn the threaded spindle in the threaded hole 30 by means of a wrench, its free end is provided with a wrench engagement head such as two wrench flats 31 diametrically opposite each other while the pressure screw 19 has a hex head 32. A rubber-elastic O-ring 21 is disposed in a fitting annular groove on the face extension 21 of the pressure screw 19, over which O-ring the pressure transmitting part 20, consisting of a conical disc and having a central bore 20' of larger diameter than that of the face extension 21 of the pressure screw 19 is pushed with slightly tight fit.

As may be seen best in FIGS. 1 and 2, the two spreader sectors 13, 14 have, at their end sections away from the supporting member 15, internal recesses 33 which are expanded in diameter and into which the spreading cone 16 can be introduced freely, while the other sections of the two spreader sectors each have semicircular recesses 34 of smaller diameter, forming, at the transition to the larger recesses 33, spreading edges 35 which may be tapered or rounded and which are contacted by the conical outside surface of the spreading cone 16. It may be seen from FIG. 2 that the spreading edges 35 are spaced a certain axial distqance apart from the front edges 13', 14' of the spreader sectors 13, 14. This distance is selected so that, if the two spreader sectors 13 and 4 are adjusted to the smallest possible diameter of a bearing bore 7 or annular groove 8, the spreading cone 16 will not project axially out of the spreader sectors 13 and 14 when the spreader sectors 13 and 14 are being introduced into the annular groove 8. The minimum distance must correspond, at least approximately, to the spreading stroke of the spreading cone 16. At their ends away from the supporting member 15 the two spreader sectors 13 and 14 have rib-like anchoring projections 36 and 37 which project radially outward and can be inserted in form closing manner in the annular groove 8 of the bearing cylinder 1, as is evident from FIG. 2. To brace these anchoring projections 36,37 in the annular groove 8, the spreading cone 16 is moved relative to the two spreader sectors 13 and 14 in the direction of arrow 38 by means of the threaded spindle 17 so that, as a result, the two spreader sectors 13 and 14 are anchored axially.

All that is required after this is to turn the pressure screw 19 by applying a wrench to its hex head 32 so that an axial motion in the direction of arrow 6 originates, through which the pressure transmitting part 20, which can center itself in the splined 4' bore of the splined hub 4, pushes the entire wheel flange hub 3 out of the roller bearing 5 which continues to be secured against axial shifting by the snap ring 10. Thereafter, the pressure tool 11 is detached from the bearing cylinder 1 in that the threaded spindle 17 is turned in the opposite direction so that the spreading cone 16 moves relative to the two spreader sectors 13 and 14 in the direction of arrow 6, thereby enabling the anchoring projections 36 and 37 to disengage from the annular groove 8. To be able to keep the two spreader sectors 13 and 14 together in the detached state of the pressure tool 11 also, a helical spring 39 whose ends are joined to form a ring is provided which is guided in external annular grooves 40 of the two spreader sectors 13 and 14. Because the annular groove 8 of the bearing cylinder 1 in which the rib-like anchoring projections 36 and 37 of the two spreader sectors 13 and 14 are anchored are located in the immediate proximity of the face of the roller bearing 5 or of the splined hub 4 it is necessary to provide for the pressure transmitting part 20 within the axial length of the two spreader sectors 13 and 14 a free space in which the pressure transmitting part 20 can be immersed in axial direction when the two spreader sectors 13 and 14 are being anchored in the annular groove 8. In applications where the diameter of the annular groove 8 or of the cylinder bore 7 of the bearing cylinder 1 is so large that the two spreader sectors 13 and 14 must be spread apart relatively far, for which purpose the spreading cone 16 would be pulled relatively far into the spreader sectors 13 and 14 in axial direction the two recesses 33 would suffice to introduce the pressure transmitting part 20 deep enough into the two ring sectors 13 and 14 axially, as may be seen in FIG. 2. But in cases where the diameter of an annular groove 8 is smaller and, consequently, the rear face 41 of the spreading cone 16 is in the immediate proximity of the annular groove 8 when the anchoring projections 36, 37 engage the annular groove 8, it is necessary to provide in the face 41 of the spreading cone 16 a recess 42 in which the pressure transmitting part 20 can be immersed.

Due to the simulaneous engagement of the two mutually opposite anchoring projections 36 and 37 of the two spreader sectors 13 and 14 with the annular groove 8 and due to their uniform, i.e. symmetrical expansion as effected by the spreading cone 16, the simultaneous result is that the spreading cone axis or threaded spindle axis, which is identical therewith, is centered in relation to the axis of the annular groove 8 and, hence, also in relation to the axis of the roller bearing 5. Therefrom follows that the pressure screw 19, too, assumes a position exactly coaxial to the axis 12 of the roller bearing 5 or of the splined hub 4 fastened therein, if the axis of the annular groove 8 and the axis of the bore 7 in which the roller bearing 5 is seated are exactly coaxial. Slight deviations in this regard can readly be equalized by the elastic mounting of the pressure transmitting part 20 on the face extension 21 of the pressure screw 19. Thus, there is assurance that the compressive forces exerted by the pressure transmitting part 20 on the splined hub 4 or wheel flange hub 3 when tuning the pressure screw 19 are axis-parallel to the axis of the roller bearing 5 in the best possible way, thereby assuring the greatest possible efficiency and functional reliability.

For the specialist, it is also easy to see from the above description and the drawings that both the design and the handling of the entire pressure tool 11 are very simple.

While specific embodiments of the invention have been shown and described in detail to illustrate the application of the principles of the invention, it will be understood that the invention may be embodied otherwise without departing from such principles.

What is claimed is:

1. A device for pushing wheel flange hubs and splined flange hubs of motor vehicles out of a shaft bearing which is press-fitted in a bearing cylinder and which has a bearing cylinder with at least one bearing face having an annular groove for the accommodation of a snap ring, comprising a pressure transmitting part, a threaded spindle supported by the bearing cylinder and disposed on said bearing cylinder, a supporting member resembling an annular disc having a threaded tap hole, two spreader sectors comprising approximately cylindrical cup-like parts arranged diametrically opposite to each other having their one ends anchored so that it can swivel and be on said supporting member and be radially adjustable, said spreader sectors being further provided at their out surface of end portions which extend away from said supporting member with anchoring projections which are insertable in a form closing fashion in the annular groove of said bearing cylinder, said spreader sectors being spreadable apart, the spindle having an exterior which is threaded and a bore which is threaded and opened at one end supported on the bearing cylinder having one end adjacent the bearing cylinder with a spreading cone, said spreader sectors being disposed around said spindle and being spreadable by said spreading cone which is located beween said bearing cylinder and said spreader sectors, said spindle being threaded into the tapped threaded hole of said supporting member and having an end disposed away from the bearing cylinder which has a wrench engagement head, and a pressure screw having one end which has a pressure transmitting part engaged into the threaded interior bore of said spindle having an outer end with a wrench engagement head.

2. A device according to claim 1, wherein said spreader sectors have faces facing said supporting member with centrally disposed axial pins, said supporting member being provided with several pairs of axially extending holes located on the same radii, as said pins but spaced differently from the center line of said tap bore in which the holes of the axial pins can be inserted so that said sectors can swivel.

3. A device according to claim 1, wherein said pressure transmitting part has an outer surface resembling a truncated cone.

4. A device according to claim 1, wherein said pressure transmitting part is elastically mounted on a trunion of said pressure screw.

5. A device according to claim 2, wherein said spreader sectors each have on their inside an annular edge which is in contact with the spreader cone and is offset relative to the anchoring projections axially towards the said supporting member by a dimension corresponding to at least the axial spreading stroke of said spreading cone.

6. A device according to claim 1, wherein said spreading cone has on its face opposite to the threaded spindle a depression in which the pressure transmitting part is axially immersible at least in part.

* * * * *